(12) United States Patent
Saleh

(10) Patent No.: US 7,579,084 B2
(45) Date of Patent: Aug. 25, 2009

(54) CERAMIC MATERIAL, COMPOSITIONS AND METHODS FOR MANUFACTURE THEREOF

(75) Inventor: Emile Saleh, Prospect (AU)

(73) Assignee: Caroma Industries Limited, Brisbane, Queensland (AU)

(*) Notice: Subject to any disclaimer, the term of this patent is extended or adjusted under 35 U.S.C. 154(b) by 148 days.

(21) Appl. No.: 11/321,005

(22) Filed: Dec. 28, 2005

(65) Prior Publication Data

US 2007/0149383 A1    Jun. 28, 2007

(51) Int. Cl.
*B32B 17/06* (2006.01)
*B32B 9/00* (2006.01)
*B32B 15/00* (2006.01)
*C04B 33/00* (2006.01)
*C04B 35/00* (2006.01)

(52) U.S. Cl. .................. 428/428; 428/426; 428/432; 501/141; 501/129; 501/130

(58) Field of Classification Search .................. 501/123, 501/129, 130, 133, 141; 428/141, 426, 428, 428/432
See application file for complete search history.

(56) References Cited

U.S. PATENT DOCUMENTS

| | | | | |
|---|---|---|---|---|
| 3,854,966 | A * | 12/1974 | Kanbara et al. | 501/124 |
| 4,102,695 | A * | 7/1978 | Claverie | 501/124 |
| 4,120,734 | A * | 10/1978 | Taniguchi et al. | 501/131 |
| 4,174,970 | A * | 11/1979 | Gelsdorf et al. | 501/90 |
| 4,191,528 | A * | 3/1980 | Boggum et al. | 432/248 |
| 4,259,121 | A * | 3/1981 | Mathieu | 106/693 |
| 5,034,448 | A * | 7/1991 | Koblinski et al. | 524/447 |
| 5,190,708 | A | 3/1993 | Vitaliano et al. | |
| 5,372,976 | A * | 12/1994 | Matsumoto et al. | 501/32 |
| 6,383,646 | B1 | 5/2002 | Tomioka et al. | |
| 6,458,732 | B1 * | 10/2002 | Doza et al. | 501/94 |
| 6,737,166 | B2 | 5/2004 | Koga et al. | |

\* cited by examiner

*Primary Examiner*—Jerry Lorengo
*Assistant Examiner*—Noah S Wiese
(74) *Attorney, Agent, or Firm*—Merchant & Gould P.C.

(57) ABSTRACT

The present invention relates to a method of producing a ceramic material comprising the steps of; a) mixing a first clay composition silica and a silicate mineral with a second clay composition; and b) firing the mixed clay composition from step a)to form a ceramic product. The present invention also relates to an engobe clay composition, sanitary ware and methods of productions thereof.

12 Claims, No Drawings

CERAMIC MATERIAL, COMPOSITIONS AND METHODS FOR MANUFACTURE THEREOF

TECHNICAL FIELD

The present invention relates to a ceramic material, a clay composition and processes for manufacture or preparation thereof. In particular, the present invention relates to a ceramic material made from the firing of clay products, a clay composition and processes for manufacture or preparation thereof. The present invention also relates to an engobe clay composition for application on a clay body before glazing and firing. One application of the ceramic material, clay composition, engobe clay composition and processes and applications therefor is in the manufacture of sanitary ware such as toilet bowls, kitchen bowls, bath tubs, wash basins, kitchen sinks, slabs, vanity bowls and the like.

BACKGROUND OF THE INVENTION

Consumer interest in the use of ceramics has resulted in a demand for intricate large sanitary ware items such as toilet bowls, kitchen sinks, slabs, vanity, bowls and the like which are made of a ceramic material. Previously, a ceramic body made of vitreous china was used due to its property of being impermeable to water. However, the manufacture of intricate, large sanitary ware items using vitreous china is difficult since vitreous china has double the firing contraction rate of a fire clay body and also suffers from the problem of significant sagging during the firing of this material to a glassy state. Thus, when using vitreous china, a user has to increase the mould size to accommodate the higher contraction rate and has to reshape the mould to offset the complex distortions which take place during the firing process.

It would be desirable to provide a ceramic material which has low distortion and contraction properties compared to vitreous china. This would then allow a wider range of shaped products to be formed including the manufacture of a wider range of sanitary ware items.

Engobe compositions are liquid clay compositions which typically contain pottery stone, clays, kaolin and feldspar and are typically applied to the surface of a clay body. The purpose of the engobe can vary and includes providing color to the clay body, improving the surface texture of the clay body; and providing a base layer to add further ornamentation or patterns thereon.

A disadvantage with the known engobe composition is that the properties of thermal shock resistance, good glaze appearance and chemical resistance are poor for fired clay products and particularly for fired sanitary ware products.

OBJECT OF THE INVENTION

It is an object of at least the preferred embodiment(s) of the present invention to overcome or at least substantially ameliorate at least one of the above problems or disadvantages or to provide a useful alternative to the prior art.

Throughout this specification, the term "clay" is intended to mean fine-grained earthy materials that become plastic when mixed with water. Clays include hydrous aluminum silicates which contain impurities, e.g. potassium, sodium, magnesium, or iron in small amounts.

Throughout this specification, the term "fire clay" includes flint clay which is typically hard and nonplastic and which resembles flint in appearance. The term "fire clay" also includes plastic fire clay. The term "fire clay" includes hard and soft embedded clay rich in hydrated aluminum silicate or silica, low in alkalis and iron, and which can withstand high temperature without fusion.

SUMMARY OF THE INVENTION

In an embodiment of the present invention, there is provided a method of producing a ceramic material comprising the steps of:
a) mixing silica, a silicate mineral and at least one first clay with a second clay which is different to the at least one first clay to form a silica/silicate clay mixture; and
a) firing the silica/silicate clay mixture clay to form a ceramic material.

In another embodiment of the present, invention, there is provided a method of producing a ceramic material comprising the steps of:
a) mixing silica a silicate mineral and at least one first clay with water to form a silica/silicate clay slurry mixture;
b) adding a second clay which is different from the at least one first clay to the silica/silicate clay slurry mixture;
c) drying the resultant clay mixture from step b); and
d) firing the dried clay mixture from step c) to form a ceramic material.

In a further embodiment of the present invention, there is provided a method of producing a ceramic material which further comprises the step of:
a) casting the clay mixture to form a desired shape;
b) drying the clay mixture; and
c) and firing the shaped clay mixture to form a ceramic material.

Step b) of casting the mixed clay composition may be in suitable moulds which are made of a suitable material such as metal, plastic or composite materials. In an embodiment, the step of casting may be in one or more plastic moulds.

The first clay composition may comprise one or more clay materials which may be selected from the group consisting of carbonaceous clays, ball clays, kaolin clays, china clays, and other suitable clays. The particular clays may be selected from the group consisting of bentonite, kyanite, kaolinlte, halloysite, dickite, nacrite, illite, montmorillonite, pyrophyllite and mixtures thereof.

The second clay which is different to the first clay may comprise one or more clay materials. The one or more clay materials of the second clay may include fire clays such as flint clay, plastic fire clays or mixtures thereof The one or more fire clay materials of the second clay may have a high degree of resistance to heat. The fire clay materials may have a fusion point higher than about 1000° C. to about 1800° C., or higher than about 1250° C. to about 1750° C., or higher than about 1400° C. to about 1700° C., or higher than about 1450° C. to about 1650° C., or higher than about 1500° C. to about 1600° C. The one or more fire clay materials may contain high percentages of silica and alumina. The one or more clay materials may contain as little as possible of such impurities such as lime, magnesia, soda, and potash, which lower the fusion point of the one or more clay materials. In an embodiment of the present invention, the second clay may also comprise flint clay. The second clay may also comprise a calcined flint clay composition The step a) of mixing at least one first clay comprising silica and a silicate mineral with a second clay and water to form a slurry may comprise mixing the first clay comprising silica and a silicate mineral with the second clay in ratios which may be as set out in the following Table I:

TABLE I

| First Clay (wt %) | Second Clay (wt %) |
|---|---|
| 90 | 10 |
| 89 | 11 |
| 88 | 12 |
| 87 | 13 |
| 86 | 14 |
| 85 | 15 |
| 84 | 16 |
| 83 | 17 |
| 82 | 18 |
| 81 | 19 |
| 80 | 20 |
| 79 | 21 |
| 78 | 22 |
| 77 | 23 |
| 76 | 24 |
| 75 | 25 |
| 74 | 26 |
| 73 | 27 |
| 72 | 28 |
| 71 | 29 |
| 70 | 30 |
| 69 | 31 |
| 68 | 32 |
| 67 | 33 |
| 66 | 34 |
| 65 | 35 |
| 64 | 36 |
| 63 | 37 |
| 62 | 38 |
| 61 | 39 |
| 60 | 40 |
| 59 | 41 |
| 58 | 42 |
| 57 | 43 |
| 56 | 44 |
| 55 | 45 |
| 54 | 46 |
| 53 | 47 |
| 52 | 48 |
| 51 | 49 |
| 50 | 50 |
| 49 | 51 |
| 48 | 52 |
| 47 | 53 |
| 46 | 54 |
| 45 | 55 |
| 44 | 56 |
| 43 | 57 |
| 42 | 58 |
| 41 | 59 |
| 40 | 60 |
| 39 | 61 |
| 38 | 62 |
| 37 | 63 |
| 36 | 64 |
| 35 | 65 |
| 34 | 66 |
| 33 | 67 |
| 32 | 68 |
| 31 | 69 |
| 30 | 70 |
| 29 | 71 |
| 28 | 72 |
| 27 | 73 |
| 26 | 74 |
| 25 | 75 |
| 24 | 76 |
| 23 | 77 |
| 22 | 78 |
| 21 | 79 |
| 20 | 80 |
| 19 | 81 |
| 18 | 82 |
| 17 | 83 |
| 16 | 84 |
| 15 | 85 |
| 14 | 86 |
| 13 | 87 |
| 12 | 88 |
| 11 | 89 |
| 10 | 90 |

Further, about 90 to about 98 wt % of the first clay comprising silica and a silicate mineral may also be mixed with about 2 to about 10 wt % of the second clay. In particular, about 92 to about 96 wt % of the first clay comprising silica and a silicate mineral may be mixed with about 4 to about 8 wt % of the second clay. Further, about 94 to about 96 wt % of the first clay comprising silica and a silicate mineral may be mixed with about 4 to about 6 wt % of the second clay. Further, about 95 wt % of the first clay comprising silica and a silicate mineral may be mixed with about 5 wt % of the second clay.

In an embodiment of the present invention, about 70 to about 85 wt % of the first clay comprising silica and a silicate mineral may be mixed with about 15 to about 30 wt % of the second clay. In another embodiment, about 75 to about 85 wt % of the first clay comprising silica and a silicate mineral may be mixed with about 15 to about 25 wt % of the second clay. In another embodiment, about 75 to about 80 wt % of the first clay comprising silica and a silicate mineral is mixed with about 20 to about 25 wt % of the second clay. In example of the invention, about 77 to about 80 wt % of the first clay comprising silica and a silicate mineral is mixed with about 20 to about 23 wt % of the second clay.

In another embodiment of the present invention, a deflocculant agent may be added to the first and second clay. The deflocculant agent may be selected from the group consisting of soda ash, sodium silicate, sodium hydroxide, sodium poly acrylate (such as Dispex N40) and deflocculants formed by the alkali extraction of lignite such as Dolaflux (sodium humates). The deflocculant may be added in an amount of about 0.01 to about 10.0 wt %, about 0.01 to about 9.5 wt %, about 0.01 to about 9.0 wt %, about 0.01 to about 8.5 wt %, about 0.01 to about 8.0 wt %, about 0.01 to about 7.5 wt %, about 0.01 to about 7.0 wt %, about 0.01 to about 6.5 wt %, about 0.01 to about 6.0 wt %, about 0.01 to about 5.5 wt %, or about 0.01 to about 5.0 wt % to the first and second clay composition. The deflocculant may also be added in an amount of about 0.01 to about 4.5 wt %, about 0.01 to about 4.0 wt %, about 0.01 to about 3.5 wt %, about 0.01 to about 3.0 wt %, about 0.01 to about 2.5 wt %, about 0.01 to about 2.0 wt %, about 0.02 to about 1.5 wt %, about 0.02 to about 1.5 wt %, about 0.03 to about 1.25 wt %, about 0.05 to about 1.0 wt %, about 0.05 to about 0.9 wt %, about 0.1 to about 0.85 wt %, about 0.2 to about 0.80 wt %, about 0.3 to about 0.75 wt %, about 0.4 to about 0.7 wt %, and about 0.5 to about 0.6 wt % to the first and second clay.

The silica may be selected from the group consisting of silica, silica sand, silica flour, quartz and flint. In an embodiment, the silica may be silica sand having a grade of up to about 30 mesh, up to about 35 mesh, up to about 40 mesh, up to about 45 mesh, up to about 50 mesh, up to about 55 mesh, up to about 60 mesh, up to about 65 mesh, up to about 70 mesh, up to about 75 mesh, up to about 80 mesh, up to about 85 mesh, up to about 90 mesh, up to about 95 mesh or up to about 100 mesh In another embodiment, the silica may be silica flour having a grade of up to about 30 mesh, up to about 35 mesh, up to about 40 mesh, up to about 45 mesh, up to about 50 mesh, up to about 55 mesh, up to about 60 mesh, up to about 65 mesh, up to about 70 mesh, up to about 75 mesh, up to about 80 mesh, up to about 85 mesh, up to about 90 mesh, up to about 95 mesh or up to about 100 mesh.

The silicate mineral(s) used in this invention may include neosilicate(s), inosilicate(s), cyclosilicate(s), phyllosilicate(s), and tectosilicate(s). The silicate mineral may include inosilicates and particularly single chain inosilicates. Some examples may include calcium silicate ($CaSiO_3$), magnesium silicate ($MgSiO_3$), and alpha dicalcium silicate ($\alpha$-$SiO_4$), and steatite ($3MgO.4SiO_2.H_2O$). In particular, the silicate mineral may be calcium silicate and more particularly may be wollastonite and still more particularly may be acicular wollastonite. The initial particle size of the silicate mineral before milling may be 99% passing 120 mesh screen.

The silica and silicate mineral may be mixed and milled together before being added to the clay material. The silica and silicate mineral may also be intimately wet milled together. The intimate wet milling may be achieved in a ball mill.

The median particle size and the particle size distribution of the silica and silicate mineral mixture after mixing and milling were tested by the SEDIGRAPH 5100 machine method. However, the particle sizes referred to in this specification are measured and expressed as "equivalent spherical diameter", or "ESD". The median particle size is the value $d_{50}$ at which there is 50 wt % of the particles present in the composition which have an ESD less than that value, as determined by the SEDIGRAPH 5100 machine method. All particle size distribution (PSD) values which are measured and reported in the specification were taken in a known manner with measurements made in water at the standard temperature of 34.9° C.

A suitable median particle size of the silica and silicate mineral blend may be up to about 100 microns, up to about 95 microns, up to about 90 microns, up to about 85 microns, up to about 80 microns, up to about 75 microns, up to about 70 microns, up to about 65 microns, up to about 60 microns, up to about 55 microns, up to 50 microns, up to about 49 microns, up to about 48 microns, up to about 47 microns, up to about 46 microns, up to about 45 microns, up to about 44 microns, up to about 43 microns, up to about 42 microns, up to about 41 microns, up to about 40 microns, up to about 39 microns, up to about 38 microns, up to about 37 microns, up to about 36 microns, up to about 35 microns, up to about 34 microns, up to about 33 microns, up to about 32 microns, up to about 31 microns, up to about 30 microns, up to about 29 microns, up to about 28 microns, up to about 27 microns, up to about 26 microns, up to about 25 microns, up to about 24.5 microns, up to about 24.0 microns, up to about 23.5 microns, up to about 23.0 microns, up to about 22.5 microns, up to about 22.0 microns, up to about 21.5 microns, up to about 21.0 microns, up to about 20.5 microns, up to about 20.0 microns, up to about 19.5 microns, up to about 19.0 microns, up to about 18.5 microns, up to about 18.0, up to about 17.5 microns, up to about 17.0 microns, up to about up to about 16.5 microns, up to about 16.0 microns, up to about 15.5 microns, up to about 15.0 microns, up to about 14.5 microns, up to up to about 14.0 microns, up to about 13.5 microns, up to about 13.0 microns, up to about 12.5 microns, up to about 12.0 microns, up to about 11.5 microns, up to about 11.0 microns, up to about 10 microns, up to about 9.5 microns, up to about 9.0 microns, up to about 8.5 microns, up to about 8.0 microns, up to about 7.5 microns, up to about 6.5 microns, up to about 6.0 microns, up to about 5.5 microns, up to about 5.0 microns, up to about 4.5 microns, up to about 4.0 microns, up to about 3.5 microns, up to about 3.0 microns, up to about 2.5 microns, up to about 2.0 microns, up to about 1.5 microns, up to about 1.0 microns and up to about 0.5 microns.

The step of mixing the silica and silicate mineral may be fine milling such that the silicate mineral and silica are intimately milled together. The silicate mineral and silica may be milled together such that the median particle size distribution is up to about 15.0 microns, up to about 14.5 microns, up to about 14.0 microns, up to about 13.5 microns, up to about 13.0 microns, up to about 12.5 microns, up to about 12.0 microns, up to about 11.5 microns, up to about 11.0 microns, up to about 10.5 microns, up to about 10.0 microns up to about 9.5 microns, up to about 9.0 microns, up to about 8.5 microns, up to about 8.0 microns, up to about 7.5 microns, up to about 7.0 microns, up to about 6.5 microns, up to about 6.0 microns, up to about 6.5 microns, up to about 6.0 microns, up to about 5.5 microns, up to about 5.0 microns, up to about 4.5 microns, up to about 4.0 microns, up to about 3 microns, up to about 2.5 microns, up to about 2.0 microns, up to about 1.5 microns, up to about 1.0 microns and up to about 0.5 microns, up to about 0.25 microns. An example of a suitable range of the median particle size of the silica and silicate mineral is from about 2 to about 10 microns.

An example of the silica and silicate mineral which may be used in this invention is silica and calcium silicate. In particular, the silica may be silica sand and the calcium silicate may be wollastonite. In a particular example, the silica sand and calcium silicate may be ground or milled and in particular may be wet milled to a median particle size of up to about 15 microns, up to about 14.5 microns, up to about 14.0 microns, up to about 13.5 microns, up to about 13.0 microns, up to about 12.5 microns, up to about 12.0 microns, up to about 11.5 microns, up to about 11.0 microns, up to about 10.5 microns, up to about 10.0 microns, up to about 9.5 microns, up to about 9.0 microns, up to about 8.5 microns, up to about 8.0 microns, up to about 7.5 microns, up to about 6.5 microns, up to about 6.0 microns, up to about 5.5 microns, up to about 5.0 microns, up to about 4.5 microns, up to about 4.0 microns, up to about 3.5 microns, up to about 3.0 microns, up to about 2.5 microns, up to about 2.0 microns, up to about 1.5 microns, up to about 1.0 microns and up to about 0.5 microns.

The particle size distribution of the blend of silica and silicate mineral may be narrow, However, the silica and silicate mineral mixture may be controlled in size so that the median particle size measured by the SEDIGRAPH 5100 is about 2 to about 10 microns, about 2.5 to about 9.5 microns, about 2.5 to about 9.0 microns, about 2.5 to about 8.5 microns, about 2.5 to about 8.0 microns, about 2.5 to about 7.5 microns, about 3.0 to about 7.0 microns, about 3.5 to about 6.5 microns, about 3.5 to about 6.0 microns, about 4.0 to about 5.5 microns, or about 4.5 to about 5 microns.

In another embodiment of the present invention, the silicate mineral and silica may be mixed or milled together with water to form a slurry, The slurry may then be blended with a flint clay composition. In a particular example, the silicate mineral is wollastonite and the silica is silica sand. The flint clay composition may be calcined flint clay.

In another embodiment of the present invention, a method for producing a slurry of the silicate and silica blend used in the methods of the invention comprises:

milling the silicate together with silica and suitable amounts of water to form a mixture having a median particle size from about 0.5 to about 15 μm and having a narrow particle size distribution; and then blending the silicate and silica slurry with a clay material.

In another embodiment of the present invention, there is provided a method of is producing a ceramic material comprising the steps:
a) mixing a first composition comprising:
  i) a silica/wollastonite slurry mixture;
  ii) a first clay material;
  iii) optionally a second clay material; and
  iv) optionally a third clay material; with
b) a second composition comprising flint clay wherein the silica/wollastonite slurry in a) i) has a median particle size selected from the group consisting of about 0.5 to about 15 microns, and may be 0.5 to about 10 microns, 1.0 to about 10 microns, 1.5 to about 10 microns, about 2.0 to about 10 microns, about 2.0 to about 9.5 microns, about 2.0 to about 9.0 microns, about 2.0 to about 8.5 microns, about 2.0 to about 8.0 microns, about 2.0 to about 7.5 microns, about 2.0 to about 7.0 microns, about 2.0 to about 6.5 microns, about 2.0 to about 6.0 microns, about 2.0 to about 5.5 microns, about 2.0 to about 5.0 microns, about 2.0 to about 4.5 microns, about 2.0 to about 4.0 microns, about 2.0 to about 3.5 microns, about 2.0 to about 3.0 microns, about 2.0 to about 2.5 microns, and about 2.0 to about 2.25 microns.

In another embodiment, the second clay material is added in step iii) above and the third clay material is added in step iv) above where the first, second and third clay material are selected from the group consisting of ball clays, kaolin, china clays; and other suitable clays.

In another embodiment of the present invention, there is provided a ceramic material comprising:
  a) at least one first clay;
  b) a second clay comprising a fire clay;
  c) silica; and
  d) wollastonite.

In another embodiment of the present invention, there is provided a ceramic material comprising:
a) at least one clay selected from the group consisting of carbonaceous clay, ball clay, china clay and kaolin clay;
b) a second clay comprising a fire clay;
c) silica; and
d) wollastonite.

The ceramic material which may be formed by the method of the present invention may comprise:
  carbonaceous clay;
  fired white plastic ball clay,
  fired white kaolin clay;
  silica sand, quartz or flint;
  calcined flint clay or mullite; and
  wollastonite.

The ceramic material which may be formed by the method of the present invention may comprise:
  about 5 to about 30 wt % carbonaceous clay;
  about 5 to about 30 wt % fired white plastic ball clay;
  about 10 to about 40 wt % fired white kaolin clay;
  about 10 to about 40 wt % silica sand, quartz or flint;
  about 10 to about 40 wt % calcined flint clay or mullite; and
  about 1 to about 20 wt % wollastonite.

The carbonaceous clay may be present in the ceramic material formed by method of the present invention in an amount of about 5 to about 30 wt %, or about 6 to about 28 wt %, or about 7 to about 26 wt %, or about 8 to about 24 wt %, or about 9 to about 22 wt %, or about 10 to about 20 wt %, or about 11 to about 18wt %, or about 12 to about 16 wt %, or about 13 to about 15 wt %, or about 14 wt %.

The fired white plastic ball clay may be present in the ceramic material formed by method of the present invention in an amount of about 5 to about 30 wt %, or about 6 to about 28 wt %, or about 7 to about 26 wt %, or about 8 to about 24 wt %, or about 9 to about 22 wt %, or about 10 to about 20 wt %, or about 11 to about 19 wt %, or about 12 to about 18 wt %, or about 13 to about 18 wt %, or about 14 wt to about 18%, or about 15 wt to about 18%, or about 16 wt to about 18%, or about 17 wt %.

The fired white kaolin clay may be present in the ceramic material formed by method of the present invention in an amount of about 10 to about 40 wt %, or about 11 to about 38 wt %, or about 12 to about 36 wt %, or about 13 to about 34 wt %, or about 14 to about 32 wt %, or about 15 to about 30 wt %, or about 16 to about 28 wt %, or about 17 to about 26 wt %, or about 18 to about 25 wt %, or about 19 wt to about 24%, or about 20 wt to about 23%, or about 21 wt % to about 23%, or about 22 wt %.

The silica sand, quartz or flint may be present in the ceramic material formed by method of the present invention in an amount of about 10 to about 40 wt %, or about 11 to about 38 wt %, or about 12 to about 36 wt %, or about 13 to about 34 wt %, or about 14 to about 32 wt %, or about 15 to about 30 wt %, or about 16 to about 28 wt %, or about 17 to about 26 wt %, or about 18 to about 25 wt %, or about 19 wt to about 24%, or about 20 wt to about 23%, or about 20 wt % to about 22%, or about 21 wt %.

The calcined flint clay or mullite may be present in the ceramic material formed by method of the present invention in an amount of about 10 to about 40 wt %, or about 11 to about 38 wt %, or about 12 to about 36 wt %, or about 13 to about 34 wt %, or about 14 to about 32 wt %, or about 15 to about 30 wt %, or about 16 to about 28 wt %, or about 17 to about 26 wt %, or about 18 to about 25 wt %, or about 19 wt to about 24%, or about 20 wt to about 23%, or about 20 wt % to about 22%, or about 21wt %.

The wollastonite may be present in the ceramic material formed by method of the present invention in an amount of about 1 to about 20 wt %, or about 1 to about 19 wt % or about 1 to about 18 wt %, or about 1 to about 17 wt %, or about 1 to about 16 wt %, or about 1 to about 15 wt %, or about 1 to about 14 wt %, or about 1 to about 13 wt %, or about 1 to about 12 wt %, or about 1 to about 11 wt %, or about 1 to about 10 wt %, or about 1 to about 9 wt % or about 1 to about 8 wt %, or about 1 to about 7 wt %, or about 1 to about 6 wt %, or about 1 to about 5 wt %, or about 2 wt % to about 5%, or about 3 wt % to about 5 wt %, or about 4 wt % to about 5 wt %, or about 5 wt %.

The ceramic material formed by method of the present invention may also comprise a deflocculant in the final ceramic material product. The deflocculant may be present in an amount of from about 0.1 wt % to about 10 wt %, or about 0.1 wt % to about 9.5 wt %, or about 0.1 wt % to about 9.0 wt %, or about 0.1 wt % to about 8.5 wt %, or about 0.1 wt % to about 8.0 wt %, or about 0.1 wt % to about 7.5 wt %, or about 0.1 wt % to about 7.0 wt %, or about 0.1 wt % to about 6.5 wt %, or about 0.1 wt % to about 6.0 wt %, or about 0.1 wt % to about 5.5 wt %, or about 0.1 wt % to about 5.0 wt %, or about 0.1 wt % to about 4.5 wt %, or about 0.1 wt % to about 4.0 wt %, or about 0.1 wt % to about 3.5 wt %, or about 0.2 wt % to about 3.0 wt %, or about 0.3 wt % to about 2.5 wt %, or about 0.3 wt % to about 2.0 wt %, or about 0.3 wt % to about 1.5 wt %, or about 0.3 wt % to about 1.0 wt %, or about 0.3 wt % to about 0.75 wt %, or about 0.3 wt % to about 0.6 wt %, or about 0.1 wt % to about 0.5 wt %, or about 0.1 wt % to about 0.4.5 wt %.

The deflocculant may be selected from the group consisting of sodium silicate, soda ash, sodium silicate, sodium hydroxide, sodium poly acrylate (such as Dispex) and deflocculants formed by the alkali extraction of lignite such as Dolaflux (sodium humates).

In a particular embodiment, the deflocculant present in the ceramic material formed by method of the present invention may be a mixture of sodium silicate, soda ash, sodium polyacrylate (Dispex) and sodium humates (Dolaflux). In particular, the deflocculant may comprise:

about 0.1 to about 1.0 wt % sodium silicate;
about 0.1 to about 0.5 wt % soda ash;
about 0.01 to about 0.05 wt % Dispex; and
about 0.01 to about 0.05 wt % Dolaflux SP NUE.

The composition of the ceramic material body components of the present invention may also be 52 to 75 wt % $SiO_2$, 16 to 30 wt % $Al_2O_3$, 1.5 to 10 wt % CaO, 0.1 to 5 wt % MgO, 0.1 to 0.8 wt % $Na_2O$ and 0.8 to 1.1 wt % $K_2O$.

The carbonaceous clay may be Morwell clay. The fired white plastic ball clay may be Axedale clay. The fired white kaolin clay may be Oakland clay.

In another embodiment of the present invention, there is provided an engobe clay composition comprising one or more clays and a silicate mineral. The engobe composition may also include one or more additional components selected from the group consisting of one or more fluxes, silica, lithium containing minerals and opacifiers.

In another embodiment of the present invention, there is provided an engobe clay composition comprising:
a) one or more clays;
b) a silicate mineral;
c) optionally, an opacifier;
d) silica;
e) one or more fluxes.

The engobe clay composition may further comprise a lithium containing mineral.

In a further embodiment, there is provided an engobe clay composition comprising;
a) one or more clays;
b) a silicate mineral;
c) optionally, an opacifier,
d) silica;
e) one or more fluxes; and
f) a lithium containing mineral comprising spodumene or petalite.

The one or more clays of component a) may be selected from the group consisting of ball clays, kaolin, china clays, and other suitable clays. The particular clays is may be selected from the group consisting of bentonite, kyanite, kaolinite, halloysite, dickite, nacrite, illite, montmorillonite, pyrophyllite and mixtures thereof, In one embodiment, component a) of the engobe clay composition may include a mixture of clays and may include one or more members selected from the group consisting of Sanblend 75® clay and Remblend® Clay. Sanblend 75® is fine grained, plastic clay, which is normally a carbonaceous clays comprising mainly of disordered to ordered kaolinite with mica and quartz minerals. Remblend® Clay is white burning kaolin having the approximate composition $Al_2O_3.2SiO_2. 2H_2O$.

The silicate mineral (b) used in the engobe composition may include neosilicate(s), inosilicate(s), cyclosilicate(s), phyllosilicate(s), and tectosilicate(s), The silicate mineral may include inosilicates and particularly single chain inosilicates. Some examples may include calcium silicate ($CaSiO_3$), magnesium silicate ($MgSiO_3$), and alpha dicalcium silicate ($\alpha$-$CaSiO_4$), zirconium silicate and steatite ($3MgO.4SiO_2.H_2O$). In particular, the silicate mineral may be calcium silicate and more particularly may be wollastonite and still more particularly may be acicular wollastonite, The initial particle size of wollastonite may be 99% passing 120 mesh screen. The engobe composition of the present invention may further comprise wollastonite. Wollastonite may be added to the engobe composition in the form of acicular wollastonite (calcium metasilicate, $CaSiO_3$).

The initial particle size of the starting raw wollastonite is pulverized using a ball mill and the resultant slurry mix may be adjusted to comprise a median particle size of about 2 to about 10 µm.

Wollastonite may be added to the engobe composition in an amount ranging from about 0.5 to about 20 wt %, or about 1.0 to about 19 wt %, about 1.5 to about 18 wt %, about 2.0 to about 17 wt %, about 2.5 to about 16 wt %, about 3.0 to about 15 wt %, about 3.5 to about 14 wt %, about 4.0 to about 13 wt %, about 4.5 to about 12 wt %, 5.0 to about 11 wt %, about 5.5 to about 10 wt %, about 5.5 to about 9 wt %, about 6 to about 8 wt %, and about 7 wt %. Wollastonite may be in the form of acicular wollastonite. The presence of wollastonite may provide improved dimensional stability green strength and may reduce the cracking and chipping of the engobe composition. Also, the addition of wollastonite in the engobe composition may substantially eliminate or at least reduce the spangling defect and provides the fire clay ware with excellent glaze appearance.

The opacifier c) may be selected from the group consisting of zirconium silicate, rutile ($TiO_2$), zinc borate, zirconium oxide, zinc oxide, titanium dioxide, tin oxide, cassiterite or any other agent which is able to make the engobe composition opaque.

The opacifier may be contained in the engobe composition in an amount ranging from about 0.5 wt % to about 20 wt %, or about 0.6 wt % to about 19 wt %, or about 0.7 wt % to about 18 wt %, or about 0.8 wt % to about 18 wt %, or about 0.9 wt % to about 17 wt %, or about 1.0 wt % to about 16 wt %, or about 1.25 to about 15 wt %, or about 1.5 to about 14 wt %, or about 1.75 to about 13 wt %, or about 2.0 to about 12.5 wt %, or about 2.5 to about 12 wt %, or about 3.0 to about 11.5 wt %, or about 3.5 to about 11 wt %, or about 4.0 to about 11 wt %, or about 4.5 to about 11 wt %, or about 5.0 to about 11 wt %, or about 7.5 to about 11 wt %, and about 10 wt %, The engobe composition of the present invention may comprise zirconium silicate ($ZrSiO_4$) or tin oxide. The presence of zirconium silicate (zircon) or tin oxide provides the engobe composition with the desired whiteness and improves the abrasion and mechanical resistance.

The silica may be selected from the group consisting of silica, silica sand, silica flour, quartz and flint. In an embodiment, the silica may be silica sand, silica quartz or silica flour having a grade of up to about 30 mesh, up to about 35 mesh, up to about 40 mesh, up to about 45 mesh, up to about 50 mesh, up to about 55 mesh, up to about 60 mesh, up to about 65 mesh, up to about 70 mesh, up to about 75 mesh, up to about 80 mesh, up to about 85 mesh, up to about 90 mesh, up to about 95 mesh or up to about 100 mesh.

The one or more fluxes in the engobe composition may comprise one or more of nepheline syenite, potash and soda feldspar, rhyolite minerals, and mesolite ($Na_2O.Al_2O_3.3SiO_2.2H_2O$). The one or more fluxes may be present in an amount of about 5 to about 30 wt %, about 7.5 wt % to about 27.5 wt %, about 10 wt % to about 25 wt %, about 10 wt % to about 22.5 wt %, or about 12.5 wt % to about 22.5 wt %, about 15 wt % to about 20 wt %, about 17.5 wt % to about 20 wt %, and about 19 wt %.

Nepheline syenite is a medium to coarse-grained, light to medium-gray, igneous rock that is composed predominantly of a silicate mineral called orthoclase ($KAlSi_3O_8$) and has a granite-like appearance. It may be distinguished from granite by little or no to quartz content (free $SiO_2$). Nepheline syenite is sometimes referred to as "blue granite" and "gray granite" varieties.

In a particular embodiment, nepheline syenite and a lithium containing mineral may be mixed together in a ratio of about 1:10, 1.5:10, 2:10, 2.5:10, 3:10, 3.5:10, 4:10, 4.5:10, 5:10, 5.5:10, 6:10, 6.5:10, 7:10, 7.5:10, 8:10, 8.5:10, 9:10, 9.5;10, 1:1, 1.1:1, 1.2:1, 1.3:1, 1.4:1, 1.5:1, 1.6:1, 1.7:12, 1.8:1, 1.9:1, 2:1, 2.5;1, 3:1, 3.5:1, 4:1, 4.5:1, 5:1, 5.5:1, 6.0:1, 6.5:1, 7:1, 7.5:1, 8:1, 8.5:1, 9:1, 9.5:1, and 10:1. However, other fluxes such as potash, feldspar, rhyolite minerals and mesolite may also be mixed in the aforementioned ratios (instead of nepheline syenite) with the lithium containing mineral.

In the engobe clay composition of the present invention, the lithium-containing mineral may also contain aluminum. The lithium containing mineral may be selected from spodumene, petalite, lepidolite or mixtures thereof. The lithium containing mineral may be contained in the engobe composition in the range of about 0.1 to about 25 wt %, about 0.2 to about 22.5 wt %, about 0.3 to about 20 wt %, about 0.4 to about 17.5 wt %, or about 0.5 to about 15 wt %, about 0.75 to about 12.5 wt %, about 1.0 to about 10 wt %, about 1.5 to about 7.5 wt %, about 1.5 to about 5 wt %, and about 2.0 to about 5.0 wt %, and about 3.0 to about 5.0 wt %.

In one example of the engobe composition, the lithium-containing mineral is spodumene which may be selected from one or both of the two varieties called Kunzite and Hiddenite. The presence of lithium-containing mineral aluminum silicate (spodumene) may provide the engobe composition of the present invention with an excellent thermal shock resistance and may lessen the incident of cooling cracks (dunts).

In a fisher embodiment of the invention, the engobe composition may further comprise a deflocculant.

The deflocculant may be selected from sodium silicate (grade vitrosol A60), Dolaflux (grade SP NEW) and Dispex (grade N40) solutions. These chemicals provide the casting slip with a long term stability and consistency. Dispex N40 is a deflocculant and dispersant material based on a lower molecular weight of sodium polyactylate Dispex N40 has 44 to 46% active sodium polyacrylate. Dolaflux is a sodium humate base deflocculant that has the following composition; silicic acid $H_2SiO_3$ s disodium salt >10%, silicic acid $H_6Si_2O_7$ hexasodium salt >10% and sodium hydroxide >0.5%.

In a further embodiment of the invention, there is provided an engobe clay composition comprising:
a) about 3 to about 43 wt % of a first clay material;
b) about 3 to about 43 wt % of a second clay material;
c) about 0.5 to about 20 wt % wollastonite;
d) about 0.5 to about 20 wt % of an opacifier;
e) about 5 to about 65 wt % silica;
f) about 3 to about 45 wt % of one or more fluxes; and
g) about 0.1 to about 25 wt % of a lithium containing mineral.

In particular, the first clay material may be present in the engobe composition in an amount of about 3 to about 43 wt %, about 4 to about 41 wto, about 5 to about 39 wt %, about 6 to about 37 wt %, about 7 to about 35 wt %, about 8 to about 33 wt %, about 9 to about 31 wt %, about 10 to about 29 wt %, about 11 to about 27 wt %, about 12 to about 25 wt %, about 13 to about 23 wt %, about 14 to about 21 wt %, about 15 to about 20 wt %, about 15 to about 19 wt %, about 15 to about 18 wt %, about 15 to about 17 wt %, and about 16 wt %.

In particular, the second clay material may be present in the engobe composition in an amount of about 3 to about 43 wt %, about 4 to about 41 wt %, about 5 to about 39 wt %, about 6 to about 37 wt %, about 7 to about 35 wt %, about 8 to about 33 wt %, about 9 to about 31 wt %, about 10 to about 29 wt %, about 11 to about 27 wt %, about 12 to about 25 wt %, about 13 to about 23 wt %, about 14 to about 21 wt %, about 14 to about 20 wt %, about 14 to about 19 wt %, about 14 to about 18 wt %, about 14 to about 17 wt %, about 14 to about 16 wt %, and about 15 wt %.

In particular, the second clay material may be present in the engobe composition in an amount of about 0.5 to about 20 wt %, or about 1.0 to about 19 wt %, about 1.5 to about 18 wt %, about 2.0 to about 17 wt %, about 2.5 to about 16 wt %, about 3.0 to about 15 wt %, about 3.5 to about 14 wt %, about 4.0 to about 13 wt %, about 4.5 to about 12 wt %, 5.0 to about 11 wt %, about 5.5 to about 10 wt %, about 5.5 to about 9 wt %, about 5.5 to about 8 wt %, about 5.5 to about 7.5 wt %, about 5.5 to about 7 wt %, about 5.5 to about 6.5 wt %, and about 6 wt %.

The opacifier may be contained in the engobe composition in an amount ranging from about 0.5 wt % to about 20 wt %, or about 0.6 wt % to about 19 wt %, or about 0.7 wt % to about 18 wt %, or about 0.8 wt % to about 18 wt %, or about 0.9 wt % to about 17 wt %, or about 1.0 wt % to about 16 wt %, or about 1.25 to about 15 wt %, or about 1.5 to about 14 wt %, or about 1.75 to about 13 wt %, or about 2.0 to about 12.5 wt %, or about 2.5 to about 12 wt %, or about 3.0 to about 11.5wt %, or about 3.5 to about 11 wt %, or about 4.0 to about 11 wt %, or about 4.5 to about 11 wt %, or about 5.0 to about 11 wt %, or about 7.5 to about 11 wt %, and about 10 wt %.

The silica may be contained in the engobe composition in an amount ranging from about 5 to about 65 wt %, or about 7.5 wt % to about 62.5 wt %, or about 10 to about 60 wt %, or about 12.5 wt % to about 57.5 wt %, or about 15 to about 55 wt %, or about 17.5 wt % to about 52.5 wt %, or about 20 to about 50 wt %, or about 22.5 to about 45 wt %, or about 25 to about 40wt %, or about 27.5 to about 37.5 wt %, or about 27.5 to about 32.5 wt %, or about 27.5 to about 30 wt %, or about 30 wt %.

The one or more fluxes may be present in the engobe composition in an amount of about 3 to about 45 wt %, about 3 to about 40 wt %, about 4 to about 35 wt %, about 5 to about 30 wt %, about 7.5 wt % to about 27.5 wt %, about 10 wt % to about 25 wt %, about 10 wt % to about 22.5 wt %, or about 12.5 wt % to about 22.5 wt %, about 15 wt % to about 20 wt %, about 17.5 Wt % to about 20 wt %, and about 19 wt %.

The lithium containing mineral may be contained in the engobe composition in the range of about 0.1 to about 25 wt %, about 0.2 to about 22.5 wt %, about 0.3 to about 20 wt %, about 0.4 to about 17.5 wt %, or about 0.5 to about 15 wt %, about 0.75 to about 12.5 wt %, about 1.0 to about 10 wt %, about 1.5 to about 7.5 wt %, about 1.5 to about 5 wt %, and about 2.0 to about 5.0 wt %, about 3.0 to about 5.0 wt %, and about 4 wt %.

In particular, the first clay material may be a carbonaceous or ball clay. An example of a carbonaceous clay is Sanblend 75 clay.

In particular, the second clay material may be a pure kaolin clay which fires white at a high casting rate. An example of a pure kaolin clay is Remblend clay.

In particular, the silicate mineral may be wollastonite.

In particular, the silicate mineral may be wollastonite.

In particular, the opacifier may be zirconium silicate or tin oxide.

In particular, the silica may be silica flour.

In particular, the lithium-containing mineral may be spodumene or petalite.

In particular, the one or more fluxes may be nepheline syenite, potash feldspars, soda feldspars, and mites thereof.

The first clay material may be a clay comprising kaolinite with mica and quartz minerals. In a particular example, the first clay may be a ball clay composition. In particular, the ball clay composition may be Sanblend 75® clay.

| Raw Materials | SiO$_2$ | Al$_2$O$_3$ | Fe$_2$O$_3$ | CaO | MgO | Na$_2$O | K$_2$O | TiO$_2$ | Ignition loss % |
|---|---|---|---|---|---|---|---|---|---|
| Sanblend 75 ® clay | 52.4 | 30.5 | 1.00 | 0.200 | 0.300 | 0.300 | 2.200 | 1.200 | 11.90 |
| Caroso FC | 56.1 | 29.1 | 0.9 | 0.1 | 0.3 | 0.3 | 2.3 | 1.3 | 9.6 |
| Sanblend 90 | 57.6 | 26.8 | 1 | 0.2 | 0.3 | 0.3 | 2.2 | 1.3 | 7.5 |

The second clay material may be a clay comprising kaolin. In a particular example, the second clay may be Remblend® clay.

| Raw materials | SiO$_2$ | Al$_2$O$_3$ | Fe$_2$O$_3$ | CaO | Na$_2$O | K$_2$O | TiO$_2$ | Ignition Loss |
|---|---|---|---|---|---|---|---|---|
| Kaolin HPC | 47.8 | 36.7 | 0.8 | 0.1 | 0.1 | 2.1 | 0.1 | 12.2 |

The opacifier may be zirconium silicate or tin oxide. The one or more fluxes may comprise nepheline syenite. The lithium containing mineral may be spodumene.

In another embodiment, there is provided a method for producing an engobe composition comprising:
  a) adding water and silica to a mill;
  b) adding optionally an opacifier, one or more fluxes and a silicate mineral to at least one clay; and
  c) grinding the components in a) and b) to a suitable median particle size.

In a further embodiment of the method for producing an engobe composition, a lithium containing mineral may be added in step b).

The step of grinding in step c) may result in a median particle size selected from the group consisting of about 0.5 to about 15 microns, and may be 0.5 to about 10 microns, 1.0 to about 10 microns, 1.5 to about 10 microns, about 2.0 to about 10 microns, about 2.0 to about 9.5 microns, about 2.0 to about 9.0 microns, about 2.0 to about 8.5 microns, about 2.0 to about 8.0 microns, about 2.0 to about 7.5 microns, about 2.0 to about 7.0 microns, about 2.0 to about 6.5 microns, about 2.0 to about 6.0 microns, about 2.0 to about 5.5 microns, about 2.0 to about 5.0 microns, about 2.0 to about 4.5 microns, about 2.0 to about 4.0 microns, about 2.0 to about 3.5 microns, about 2.0 to about 3.0 microns, about 2.0 to about 2.5 microns, and about 2.0 to about 2.25 microns.

composition fires more vitreous than the ceramic body it covers, the engobe composition does not become glassy like a glaze during firing. One of the benefits of using an engobe is that it can be applied over a wet or dry clay body, and then fired to the clay's specified temperature. Engobes can be painted, brushed, sprayed and layered. An engobe in a stiffer form can be used to add texture, and after the piece is fired, a stain wash can be applied to highlight the surface.

In another embodiment, the ceramic material of the present invention may comprise one ore more layers of the engobe composition of the present invention.

DETAILED DESCRIPTION OF THE PREFERRED EMBODIMENTS

At least one preferred embodiment of the present invention will now be described, by way of example only, which is not intended to limit the scope and generality of the invention as defined in the claims of the present invention.

EXAMPLES OF THE INVENTION

In the following examples of the present invention, reference is made to one or more of the following clay materials, the chemical composition of which are set out in Table II below.

TABLE II

| Raw materials | SiO$_2$ | Al$_2$O$_3$ | Fe$_2$O$_3$ | CaO | MgO | Na$_2$O | K$_2$O | ZrO$_2$ | Li$_2$O | TiO$_2$ | Inigtion Loss |
|---|---|---|---|---|---|---|---|---|---|---|---|
| Oakland Clay | 48.4 | 34.4 | 0.99 | 0.12 | 0.25 | 0.15 | 2.85 | — | — | 1.6 | 10.9 |
| Morwell clay | 62.4 | 21.6 | 0.85 | 0.12 | 0.14 | 0.04 | 0.26 | — | — | 3.01 | 11.2 |
| Axedale clay | 59.4 | 26.0 | 1.02 | 0.03 | 0.83 | 0.3 | 3.19 | — | — | 1.58 | 7.37 |
| Calcined flint clay | 50.6 | 46.5 | 0.8 | 0.2 | 0.1 | 0.1 | 0.1 | — | — | 0.8 | 0.1 |
| Zirconium silicate | 32.1 | 1.33 | 0.07 | — | — | — | — | 65.6 | — | 0.12 | 0.53 |
| Spodumene | 66.3 | 26.8 | 0.07 | 0.01 | 0.00 | 0.17 | 0.11 | — | 7.65 | 0.01 | 0.52 |
| Wollastonite | 51.0 | 0.2 | 0.4 | 47.5 | 0.1 | — | — | — | — | 0.02 | 0.68 |
| Silica Sand | 99.8 | 0.09 | 0.04 | 0.0 | 0.0 | 0.0 | 0.0 | — | — | 0.0 | 0.03 |
| Nepheline Syenite | 60.1 | 23.5 | 0.09 | 0.41 | 0.02 | 10.4 | 5.0 | — | — | — | 0.44 |
| Remblend clay | 48.0 | 37.0 | 1.0 | 0.07 | 0.30 | 0.1 | 2.0 | — | — | 0.05 | 12.5 |
| Sanblend 75 | 52.4 | 30.5 | 1.0 | 0.2 | 0.3 | 0.3 | 2.2 | — | — | 1.2 | 11.9 |

The engobe composition, may range in color (for example from red to buff) may be applied between the ceramic body and the glaze layer. The engobe composition is typically classified between a glaze and a clay. Although the engobe The ignition loss % (LOI) summarizes the components within a raw material that burn away or products of decomposition that are lost as gases during firing. Some companies separate the different components of weight lost during firing as C, H₂O, SO₃, etc. A formula weight of zero should be used in each oxide of this type so there is no impact on fired formula calculations.

Example 1

In a first example of the present invention, there is shown a method of producing a ceramic material in accordance with the present invention.

A first step of the method is producing a silica sand/wollastonite slurry mixture. This is achieved by a wet milling step of wollastonite and silica sand as follows. Wet milling is used to grind silica sand (30 mesh grade) and wollastonite (common grade) together. High density Alubit grinding media is used Silica and wollastonite are milled together for 12 hours or less to give a specified median particle size. In particular examples, the silica sand and calcium silicate (wollastonite) may be ground or milled to achieve a median particle size of up to 10 microns.

In this example of the invention, a silica /wollastonite slurry is formed by mixing 3500 kg of silica sand with 1500 kg of wollastonite and water to form a slurry like consistency. The wollastonite may be selected from commercially available common grades of wollastonite including acicular wollastonite. Some examples of wollastonite are Kemolite A60 and FW 70 C. The starting particle size of the common grade wollastonite raw material is 99% passing 120 mesh screen. The silica is available as silica sand which is commercially available as silica sand grade 30 to 40 mesh. Suitable addition of water is added to the silica/wollastonite mixture in order to arrive at the desired slip density for the desired mixing blunger. In one example of the invention, 26 dry wt % of the silica/wollastonite mixture slurry is added to the mixing blunger.

Thereafter, a further step of the method is adding 14 wt % of dry Morwell clay (carbonaceous ball clay grade) to the silica/wollastonite slurry mixture.

Thereafter, a further step is adding 0.1% of soda ash solution (light soda ash grade Na₂CO₃) by way of incremental amounts using a special dosing pump.

Thereafter, a further step is adding 17-19 wt % of Axedale clay (High plastic white fired ball clay).

Thereafter, a further step is adding approximately half of a mixture of 0.2 wt % sodium silicate (grade vitrosol A60), Dolaflux (grade SP NEW) and Dispex (grade N40) solutions. These chemicals were selected to provide the casting slip with a long term stability and consistency. Dispex N40 is a deflocculant and dispersant material based on a lower molecular weight of sodium polyacrylate. Dispex N40 has 44 to 46% active sodium polyacrylate.

Dolaflux is a sodium humate base deflocculant that has the following composition; silicic acid H₂SiO₃ disodium salt >10%, silicic acid H₆Si₂O₇ hexasodium salt >10% and sodium hydroxide >0.5%.

Thereafter, a further step of the present invention is adding 22 wt % of Oakland clay (Low plasticity Kaolin grade K40).

The method of the present invention then comprises mixing the composition comprising the clays and other components mentioned above for approximately 75 minutes or longer in order to enable a good balance of the desired particle size distribution in the final clay composition. The mixing is achieved by a high speed blunger.

Thereafter, calcined flint clay (grade 120 mesh) is then added to the composition from the high-speed blunger together with the remaining portion of the mixture of sodium silicate, Dolaflux and Dispex solutions. The resulting composition is then mixed for approximately another 45 minutes or longer to ensure proper control of the particle size distribution of the final mixture.

The resultant prepared slip composition is then aged for approximately 72 hours or longer. The aging of the slip composition is required to achieve the slip stability before casting into desired shapes.

In the casting process, the slip slurry is poured into plaster moulds and allowed to cast for a specified time period. The casting time of the clay body of this example is in the range of 55 to 65 minutes to achieve 12 mm thickness in the hollow cast areas. The green ware is then removed from the moulds, dried over one night in the open cast shop. Then the ware is completely dried in the chamber drier for 12 hours. Then two layers of engobe are applied onto the dried ware. Immediately 4 layers of first fire glaze are applied on the top of the engobe. The spayed ware is placed onto the kiln car and fired at 1195° C. for 15 hours.

The resulting fire clay ceramic clay body comprises:
14 wt % Morwell clay;
17 wt % Axedale clay;
22 wt % Oakland clay;
26 wt % silica/wollastonite; and
21 wt % calcined flint clay.

It should be noted that the main constituents of the fire clay body comprise Morwell clay, Axedale clay, Oakland clay, silica/wollastonite and calcined flint clay represent 100 wt %. Sodium Silicate, Dispex, Dolaflux and soda ash deflocculants act as modifiers to the casting slip rheology and usually are not considered as main constituents. They are present in addition in the fire clay body in the following amounts:
0.2 wt % sodium silicate, Dispex and Dolaflux; and
0.1 wt % soda ash.

The preferable content of the body components are 52 to 75 wt % $SiO_2$, 16 to 30 wt % $Al_2O_3$, 1.5 to 10 wt % CaO, 0.1 to 5 wt % MgO, 0.1 to 0.8 wt % $Na_2O$ and 0.8 to 1.1 wt % $K_2O$.

The ceramic body resulting from the method of the present invention achieved the following advantages:
1. Dunting (cooling cracks) tendency was reduced;
2. Excellent thermal shock resistance;
3. Improvement in the re-firing process;
4. Unfired and fired strength were increased by almost 35%;
5. The differential moisture content between the hollow and solid section within the cast was reduced; and
6. Significant improvement of the glaze appearance.

Engobe Composition

Before glazing of the ceramic body of the present invention, an engobe composition is applied to the surface of the ceramic body. The engobe composition is a mixture of clays, fluxes, silica zirconium silicate and wollastonite which is applied on the fire clay body to form a homogenous thin coating, usually applied to smoothly cover all surface defects. It should be noted that the engobe composition of the present invention should not be restricted to the clay bodies described in the present invention but can be used on any suitable clay surface or other substrate. The engobe composition of the present invention is as follows:
16 wt % Sanblend 75 clay (or other carbonaceous clay)
15 wt % Remblend clay (or other pure kaolin which fires white at high casting rate)
6 wt % wollastonite
10 wt % zirconium silicate
30 wt % silica flour
4 wt % spodumene or petalite;
19 wt % nepheline syenite, potash feldspars and soda feldspars.

In the above example, Sanblend 75 clay in another example can be substituted by any other carbonaceous clay that has high dry and fired strength. The Remblend clay in another example can be substituted by any other pure kaolin that fires white with a high casting rate. In another example, spodumene can be substituted by Petalite minerals. In another example, nepheline syenite can be replaced by a mixture of potash and soda feldspars.

Process of Production of Engobe Composition

The engobe composition is prepared by milling the components:
Sanblend 75 clay
Remblend clay
wollastonite
zirconium silicate
silica flour
spodumene; and
nepheline syenite;

in a 1500 kg capacity ball mill as follows.

First Preparation:
a) Add 800 litres of water to the ball mill;
b) Add 450 kg silica flour (fineness 55% <10 microns);
c) Add 150 kg zirconium silicate (fineness 90% <5 microns);
d) Add 285 kg nepheline syenite (fineness 50% <10 microns); and
e) Add 60 kg spodumene (fineness 55% <10 microns).
f) Add 90 kg wollastonite (120 mesh)

Firstly grind the above components for 4.5 hours.

Second Preparation:

In the same mill and after the 4.5 hours are completed, add the rest of the components as follows:
Add 240 kg Sanblend 75 ball clay, and,
Add 225 kg Remblend kaolin.

Secondly, after the addition of the clays grind for extra 1.5 hours.

Engobe slurry must have a particle size distribution of up to 10 microns size in the range of 79-86%.

The advantages of the Engobe composition of the present invention are as follows;
1. Improved thermal shock resistance of the fired ware.
2. Improved fired mechanical strength of the ware.
3. Reduced cooling cracks (dunt) faults.
4. Greatly improved glaze surface appearance, Modifications and variations such as would be apparent to a skilled addressee are deemed to be within the scope of the present invention. It is to be understood that the invention should not be restricted to the particular embodiment(s) as described above.

The invention claimed is:

1. A method of producing a ceramic material comprising the steps of:
   a) wet milling a silicate mineral and silica to a medium particle size of from about 2 μm to about 10 μm to form a slurry;
   b) mixing the slurry and at least one first clay with a second clay which is different to the at least one first clay, and which second clay is a fire clay, to form a silica/silicate clay mixture; and
   c) firing the silica/silicate clay mixture clay to form a ceramic material.

2. A method of producing a ceramic material according to claim 1, wherein the at least one first clay in step b) comprises at least one clay selected from the group consisting of Morwell clay, Axedale clay and Oakland clay.

3. A method according to claim 1, wherein the silica is selected from the group consisting of silica sand, silica flour, quartz and flint.

4. A method according to claim 1, wherein the silicate mineral is selected from the group consisting of calcium silicate, magnesium silicate, sodium titanium silicate, sodium aluminum silicate, sodium calcium silicate hydroxide, hydrated calcium silicate hydroxide, calcium iron silicate, magnesium iron silicate, calcium magnesium silicate and calcium aluminum silicate.

5. A method according to claim 4, wherein the silicate mineral is calcium silicate or wollastonite.

6. A method according to claim 1, wherein the silica is silica sand and the silicate mineral is wollastonite.

7. A method according to claim 1, wherein the second clay composition comprises flint clay.

8. A method according to claim 1, further comprising adding a deflocculant selected from the group consisting of soda ash, sodium polyacrylate, sodium humate and mixtures thereof.

9. A method according to claim 7, wherein the flint clay is calcined flint clay.

10. A ceramic material produced by the method of claim 1.

11. A method of manufacturing sanitary ware comprising
    a) mixing a first composition comprising:
       i) a silica/wollastonite slurry mixture having a median particle size of from 0.5 to about 10 microns; with
       ii) a first clay and a second clay;
    b) mixing the first clay in step a) with a fire clay;
    c) shaping the resulting composition; drying and firing the composition.

12. A method according claim 11, wherein a deflocculant selected from the group consisting of sodium silicate, sodium humate and sodium polyacrylate solutions and mixtures thereof is added to the first clay composition.

* * * * *

UNITED STATES PATENT AND TRADEMARK OFFICE
CERTIFICATE OF CORRECTION

PATENT NO. : 7,579,084 B2  Page 1 of 1
APPLICATION NO. : 11/321005
DATED : August 25, 2009
INVENTOR(S) : Emile Saleh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this

Fourteenth Day of September, 2010

David J. Kappos
*Director of the United States Patent and Trademark Office*